Nov. 9, 1948.  C. S. GORDON  2,453,313
METHOD OF MANUFACTURING COMMUNICATION CABLES
Filed April 29, 1943
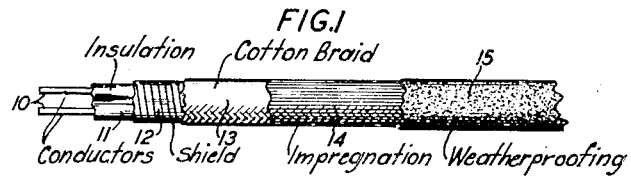
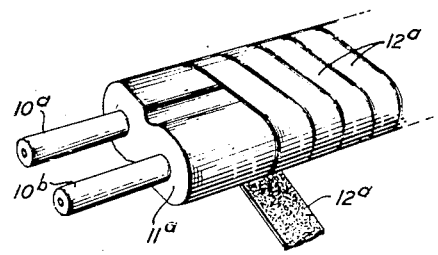
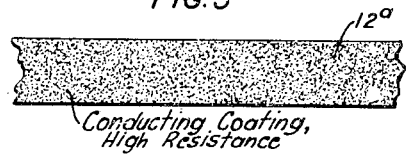
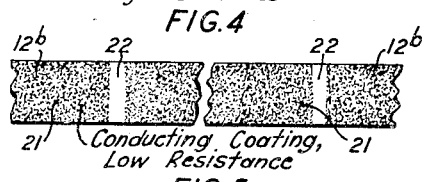
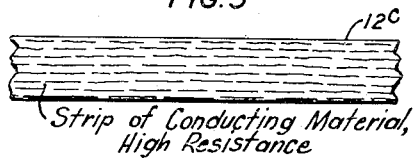
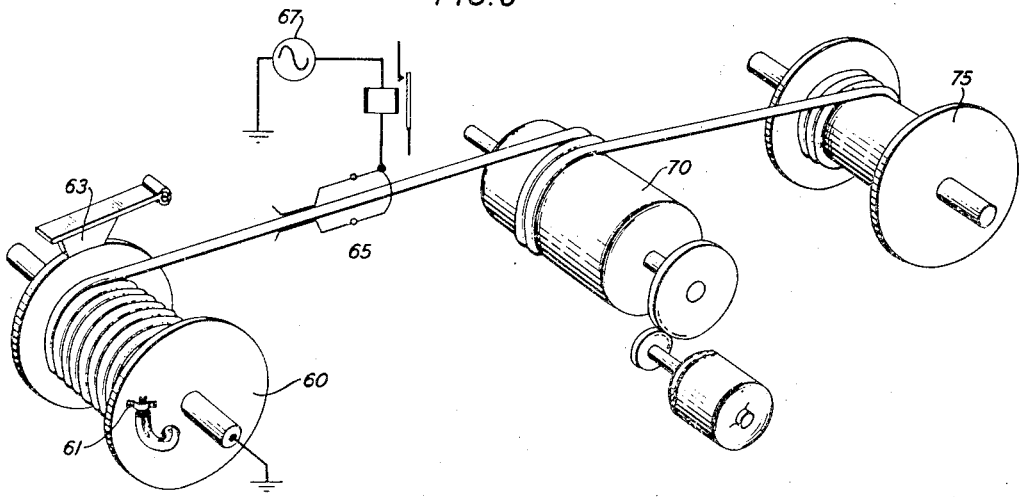
INVENTOR
C. S. GORDON
BY
*[signature]*
ATTORNEY Patented Nov. 9, 1948

2,453,313

UNITED STATES PATENT OFFICE 2,453,313

METHOD OF MANUFACTURING COMMUNICATION CABLES

Chester S. Gordon, Boonton, N. J., assignor to Bell Telephone Laboratories, Incorporated, New York, N. Y., a corporation of New York Application April 29, 1943, Serial No. 484,970

2 Claims. (Cl. 154—2.26)

The invention relates to methods of manufacturing communication cables and more particularly cables of this type having a substantially water-impervious insulation, which in service is subjected to atmospheric conditions.

In a certain type of communication cable the individual conductors are insulated with a water-impervious insulation, such as vulcanized rubber. The cable usually includes a pair or a quad of conductors, which may be separately insulated or included in a common envelope of insulating material. In certain fields of use, as for military purposes, the cables are operated at comparatively low carrier frequencies, for example, about 12 kilocycles; for other purposes the carrier frequency may be as high as 100 kilocycles. The cable insulation is subjected to weather conditions, particularly since the cables are not provided with a lead sheath, and for certain uses the cables are subjected to rough handling which requires that they be protected by outer abrasion-resistant layers.

It has been observed that the transmission characteristics of cables of this type vary appreciably with changing moisture conditions of the atmosphere; thus, as the surface of the insulation proper changes from a dry to a wet condition, the mutual capacitance between conductors may increase as much as 100 per cent.

For these reasons it has been proposed to stabilize the transmission characteristics of such cables under changing atmospheric conditions. The characteristics of the cable are stabilized at values that correspond to the wet condition by applying a conducting coating or layer about the insulation proper and in direct contact therewith. The stabilizing layer may be applied about the individual insulated conductors or about a group of insulated conductors, such as pairs, quads or larger groups. The conducting layer has usually been in the form of a flexible metallic braid or a thin metal tape and in the case of individually shielded conductors the shields about conductors in the same transmission circuit have been interconnected, as by being in close mutual contact along the cable to establish what may be termed a common artificial ground.

In the manufacture of rubber insulated cables it is customary to pass the cable through a testing equipment with the object of locating possible faults in the insulation. For this purpose the cable is passed from a reel and between a set of exploring electrodes, which applies a high potential to a short portion of the outer surface of the cable while the inner conductors are grounded at the reel. The cable is pulled through this device by any convenient means, such as a capstan, and is rereeled. The voltage applied is sufficient to cause the insulation to break down at any point, in the course of passing between the electrodes, which is below the standard requirements; the consequent spark discharge may be observed and may be utilized to automatically stop the progress of the cable. The exact location of the fault, which at the high speed of operation may have passed some distance beyond the electrodes, may thereafter be more accurately determined by means of manually operated exploring electrodes connected in the same or a similar circuit.

It is, of course, desirable to check the condition of the cable insulation after the cable is completed, since defects are likely to occur in the handling of the cable in any of the stages of manufacture. It has, however, not been satisfactory to apply the breakdown test after the conducting screen or layer has been applied because the high potential applied in the test would be extended by the screen to the whole cable length, thereby merely establishing the presence or absence of a fault but preventing the location of the fault or faults.

It is, therefore, an object of the invention to provide a method of manufacturing a stabilized communication cable which includes the location of faults in the insulation of the cable.

In accordance with a feature of the invention, the described method of locating insulation faults is applied to cables having an outer stabilizing layer as described above.

In accordance with another feature of the invention, a cable with an outer conducting layer is adapted for the said method of locating faults by means of high potential exploring electrodes.

In accordance with a more specific feature of the invention, the conducting stabilizing layer, applied about a cable core having a water-impervious insulation, has a large over-all or average resistance. Thus, the layer may have a uniform high resistance throughout its length or it may have comparatively short sections of low resistance separated by narrow zones which may be practically non-conducting.

By this provision the advantage is gained that the high potential applied to the cable surface for testing purposes will extend only over a comparatively short length of the cable. Thus due to the localized extent of the high voltage field through the insulation only a fault passing into the field will be subject to breakdown. Furthermore, the high potential may readily be kept away from the cable reels and machinery, thereby minimizing danger to personnel.

The semiconducting or high resistance conducting layer may be formed in different manners. The principal requirements are that the layer should remain permanent during the service and thus should be practically unaffected by temperature and moisture variations. The coating usually should be flexible. The coating may be formed by applying a helical or longitudinal tape which presents the required conductivity. The coating may, furthermore, be formed as a lacquer including conducting particles either applied to the tape or to the surface of the insulation. The lacquer should be insoluble in water. The conducting pigment in the lacquer may be carbon-black or powdered graphite mixed in with a density corresponding to the desired conductivity; this type of continuous conducting coating may be made to have a resistance of from .1 up to 10 meghoms per linear foot of cable. The carbon-black or graphite or any other conducting material in powder form may, however, be mixed into the paper proper. In a modification the conducting layer may be formed on the tape or on the surface of the insulation by, for example, spraying high conductivity metal particles thereon with the desired density but with interruptions to form a series of conducting sections of suitable length separated by short uncoated spaces.

The invention will now be described more in detail as to its construction and operation and as applied to specific embodiments and reference will be made to the attached drawing. It should be understood, however, that the illustrated embodiments are to be considered as examples and that the scope of the invention is defined by the claims.

In the drawing:

Fig. 1 shows a cable structure arranged in accordance with a feature of the invention; the figure shows only an end portion of the cable with the various successive layers removed in successive portions for the sake of illustration;

Fig. 2 is a perspective view of a two-conductor cable core stabilized in accordance with a feature of the invention;

Figs. 3, 4 and 5 show samples of different types of tape which may be used for the stabilizing shield or layer; and Fig. 6 shows diagrammatically the method of locating faults in a cable, such as that shown in Fig. 1.

Referring now more particularly to Fig. 1, the cable may have two or more conductors 10; each conductor may be solid or stranded in any desired manner, surrounded by a layer of insulation 11 which in the preferred form is of rubber, vulcanized in position on the conductor to be substantially impervious to water. The insulation may be formed on each conductor or in the case of two conductors it may be simultaneously formed about both; thus, Fig. 2 shows two conductors 10a and 10b included in a common body of insulation 11a.

About the insulation is applied the stabilizing shield 12 in the form of a helical fibrous tape treated to establish a semiconducting layer or shield in direct contact with the rubber insulation; the tape may be applied with an overlap. The tape may be applied longitudinally instead of being served. The cable is covered with outer protecting layers including, first, a cotton braiding 13 which is impregnated with an asphaltic saturating compound 14 applied to penetrate the braiding and to some extent the fibrous tape in the stabilizing layer 12. The outermost layer is a comparatively heavy weather-proofing and abrasion-resistant coating 15, such as a flexible mixture of asphalt, stearine pitch and wax.

Whereas the impregnation and the outer protecting layer 15 are effective in protecting the cotton braiding against direct contact with the atmospheric conditions and against rotting, they do not form a hermetic seal against moisture. However, with the stabilizing layer or shield 12 covering the surface of the insulation, a conducting condition is established on that surface which will be permanent and will simulate the conducting condition which would be established by the cotton braiding saturated with moisture.

The tape 12 may take different forms, examples of which are shown in Figs. 3, 4 and 5. Thus, as shown in Fig. 3, the tape 12a is of paper one side of which has a high resistance, conductive coating. The coating preferably is a flexible lacquer, as of nitrocellulose with a plasticizer, such as dibutyl phthalate, into which has been uniformly mixed a quantity of carbon-black. The amount and type of carbon-black in the lacquer may be controlled to provide the desired resistivity of the coating.

The tape 12a is helically applied, as shown in Fig. 2. A continuous high resistance surface thus is applied directly in contact with the surface of the insulation 11a. The conducting surface established by the tape will be permanent and the transmission characteristics of the cable will remain practically constant under varying moisture conditions.

The tape shown in Fig. 4 may be a fibrous strip, such as paper or cotton, with an interrupted layer of highly conducting material, such as a metal foil or finely divided metal particles, which may be sprayed on with or without a binder in a thin coating. The layer is separated into sections 21 by intervening narrow spaces 22, the length of each section being from about 5 inches to 2 feet. When the tape is applied to the insulated conductors, it will form a discontinuous metallic layer so that, when a high potential is applied to a short portion of the cable, the effect will be limited substantially to that portion.

The strip 12c shown in Fig. 5 is a paper strip containing particles of conductive material, such as powdered graphite or carbon-black. The powdered material may be mixed with the pulp in the beater in the manufacture of the paper strip. By controlling the amount of powder, the conductivity of the strip may be controlled. Commercial opaque black paper, such as is used for protection of photographic films or paper, may be found suitable for this purpose.

In the manufacture of the cable the insulated conductors with the tape and braiding applied will be placed on reels for subsequent application of impregnation and the outer weather-proofing. Following the application of the braiding and weather-proofing, it is desirable to check the soundness of the insulation. For this purpose the finished cable is passed through testing equipment, such as shown diagrammatically in Fig. 6. If desired, a preliminary test of the insulation may be made at some intermediate stage of manufacture as, for example, immediately after the application of the braiding.

As shown in Fig. 6, the reel 60 with the cable is arranged so that the conductors at the inner end of the cable may be grounded at the reel, as shown at 61. All the conductors will be grounded in this manner. The free end of the cable is passed through a suitable contact arrangement 65, which may be connected through a relay or other control circuit 66 to a grounded source 67 of high potential. The potential produced by the source 67 may be alternating with a magnitude of from 5,000 to 15,000 volts (root mean square), depending upon the thickness and nature of the insulation, and may be of any convenient frequency. Alternatively, the test potential may be a constant voltage of from 7,000 to 21,000 volts.

The contact device 65 is shown schematically and may be arranged in any convenient manner to engage nearly the entire circumference of the cable cross-section and should also be arranged to engage from 2 to 5 linear feet of the cable.

The cable may be advanced continuously between the electrodes 65 at a speed of a few hundred feet per minute by any convenient means. Thus, as shown in the drawing, the cable is passed with a few turns about a motor-driven capstan 70 and is thereafter fed onto another reel 75 which usually is driven through a friction clutch. The reel 60 may be provided with a conventional brake 63 for quickly stopping the reel when a defect in the insulation is detected. Such braking may also be applied to the capstan 70.

As the cable passes between the electrodes 65 the electric field between them and the conductors within the cable will pass through the conducting layer and through the insulation. By means of the conducting layer the stress will be uniformly distributed about the cable to subject all parts of the insulation under the electrodes equally to the breakdown test. Due to the high resistance of the conducting coating on the tape, such as that shown in Fig. 3, or to the general limited conducting condition of the tape shown in Fig. 5, the potential will be gradually reduced to low values over short distances along the cable of from 1 to 5 feet in either direction from the electrodes 65. Thus, the reel 60 and capstan 70 should be spaced from the electrodes 65 beyond any portion of the cable at which an excessive potential may exist. In the case of the tape shown in Fig. 4, the length of each metallized section, as measured along the cable, should be comparable with the distance from the electrodes to the nearest grounded structure with which the cable makes contact. Thus, at least one or two of the interruptions 22 between conducting sections 21 should at any time be located between the electrodes 65 and the reel 60 or the capstan 70.

When a weak spot in the insulation passes between the electrodes 65 or passes within the localized effect of the high potential, the insulation at that spot will break down and the consequent discharge or arc may be observed. Any convenient arrangement may be included in the high voltage circuit, as the relay 66, to automatically stop the progress of the cable, as by means of the brake 63. Thereafter the electrodes 65 or another hand-operated set of exploring electrodes (not shown) may be passed over the portion of the cable where the fault has been observed, for the final determination of its location.

It should be understood that the invention is applicable also to cables insulated with synthetic rubber or with other rubber substitutes, such as synthetic plastomers which are water impervious, or with other gums.

What is claimed is:

1. In a method of manufacturing a long communication cable having a pair of commonly insulated conductors surrounded by a conducting shielding layer, the step of applying breakdown voltage between the entire length of the conductors and successive short portions of the shielding layer for breakdown of the insulation at a weak spot within the portion subjected to the voltage, and the step of limiting the extent of any one of said portions to within a few feet by making the shielding layer sufficiently resistant longitudinally of said cable of the order of $\tfrac{1}{10}$ to a few megohms average per foot of cable.

2. A method of manufacturing a long communication cable comprising applying directly about a pair of conductors encased in a common insulating body a conducting layer of high conductivity metal for stabilization of the electrical properties of the insulated conductors, sectionalizing said conducting layer to increase its overall resistance for localization in the lengthwise direction of the effect of an applied test voltage, applying said test voltage between the conductors and the successive portions of said conducting layer for breakdown of a fault in the insulation of said insulated conductors within the localized lengths of the cable, and then applying an outer protecting layer about said conducting layer.

CHESTER S. GORDON.

REFERENCES CITED

The following references are of record in the file of this patent:

UNITED STATES PATENTS

| Number | Name | Date |
|---|---|---|
| 1,084,910 | Stephenson | Jan. 20, 1914 |
| 1,418,856 | Williamson | June 6, 1922 |
| 1,924,840 | Droste et al. | Aug. 29, 1933 |
| 2,176,757 | Borden | Oct. 17, 1939 |
| 2,234,068 | Wiseman | Mar. 4, 1941 |
| 2,282,832 | Spooner | May 12, 1942 |
| 2,322,702 | Peterson | June 22, 1943 |
| 2,386,127 | Longfellow | Oct. 2, 1945 |

FOREIGN PATENTS

| Number | Country | Date |
|---|---|---|
| 348,311 | Great Britain | May 14, 1931 |